Sept. 15, 1959          E. S. WILSON          2,904,006
ANIMAL HOLDING MEANS
Filed March 17, 1958          2 Sheets-Sheet 1
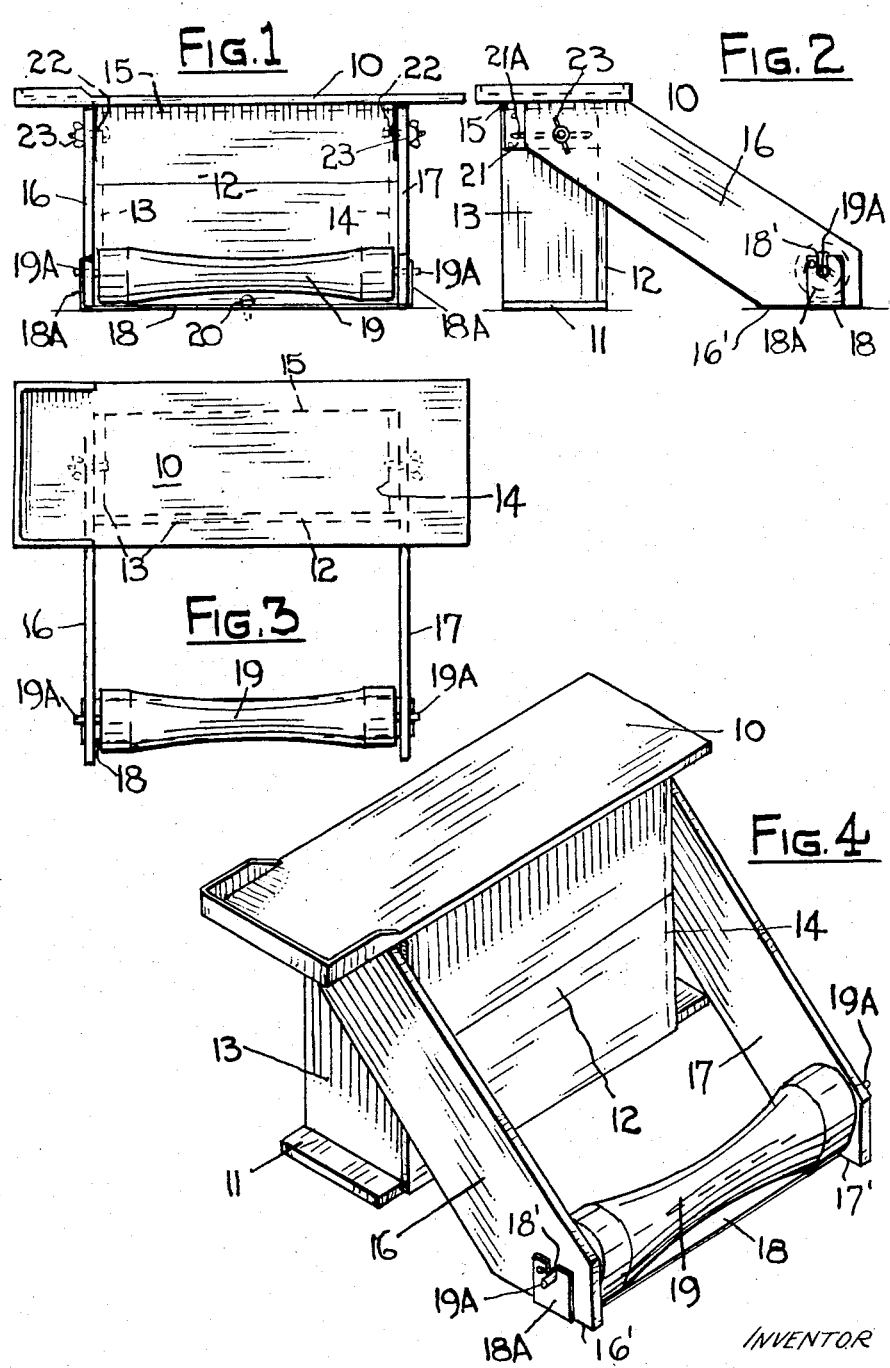
INVENTOR
ERIC STEWART WILSON
By Irvin S. Thompson
ATTY.

Sept. 15, 1959   E. S. WILSON   2,904,006
ANIMAL HOLDING MEANS
Filed March 17, 1958   2 Sheets-Sheet 2
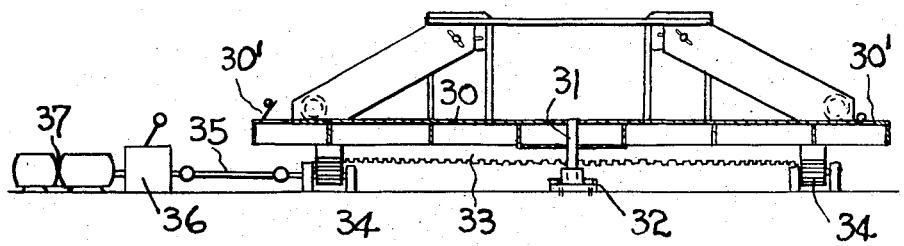
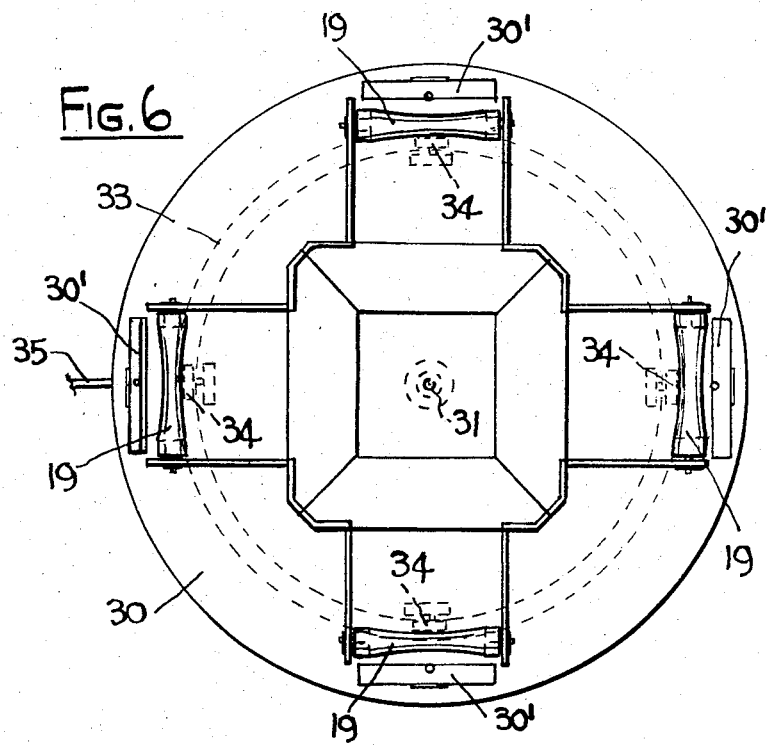
INVENTOR
ERIC STEWART WILSON
BY Irwin S. Thompson
ATTY.

2,904,006

ANIMAL HOLDING MEANS

Eric S. Wilson, Kimbolton, New Zealand

Application March 17, 1958, Serial No. 721,843

Claims priority, application New Zealand March 25, 1957

4 Claims. (Cl. 119—103)

This invention relates to an improved animal holding means and is particularly designed for and will be described mainly hereinafter for supporting sheep in an inverted position so that treatment may be easily given them such as, for instance, attention for footrot.

Various types of means as cradles are at present in use and generally are a box-like structure into which a sheet is confined, and then, by inversion of the structure or part thereof, the sheep is ready for treatment. Such types of means are essentially of a nature that they are a fixture, as in a race, or such that they are not easily transportable.

One object of the present invention is to provide an animal holding means as a cradle or holder that is simple in its construction and which may be cheaply fabricated and used where desired.

Another object of the invention is to provide a means embodying a number of cradles so that a number of sheep may be treated at the same time.

Accordingly, the invention covers an improved animal cradle or holder comprising a raised back, side members declining from the back at a distance apart to accommodate the animal, a roller journalled in the lower ends of the side members, and provision for attaching or mounting the back or a side member to a fixture whereby the animal may be moved by its back over the roller to be confined in the space between the side members and be supported on the ground or floor surface, the back and the roller.

Further, the invention covers means for holding a number of animals, comprising a platform or framework mounted for rotation about a vertical axis and having at intervals around its periphery a number of animal holding cradles, each being so constructed that an animal may be drawn into the cradle and held temporarily captive, each said cradle having associated with it a seat upon which an operator may sit so that he or she may ride on the platform as it is revolved.

In further describing the invention reference will be made hereinafter to the accompanying drawings, in which:

Figure 1 is a front view,
Figure 2 is a side view,
Figure 3 is a plan, and
Figure 4 is a perspective view of the cradle on an enlarged scale;
Figure 5 is a sectional elevation on a reduced scale, and
Figure 6 is a plan on a reduced scale of the means as a turntable mounting a number of the cradles.

In further describing the cradle the back preferably comprises a seat member 10 and an underframing supporting the seat member 10. The underframing comprises a base 11, a front 12, vertical ends 13, 14 and a top 15.

The side members 16, 17 are of a length to be substantially the length of a body of a sheep with the lower ends 16′ and 17′ of these side members shaped to sit on the ground or floor. Preferably attached to such ends is an iron understrap 18 attached between the lower ends of such members, which strap may be designed to rest on the ground or floor instead of the said ends. This strap 18 is provided with bearing eyes 18′ in its turned-up ends 18A, in which axle stubs 19A of the roller 19 can be freely journalled, and the centre of the strap can be formed with an aperture (not shown) through which a bolt 20 (Figure 1) can be passed to temporarily anchor the holder down. The roller 19 is preferably a wooden one, or one covered with a resilient sleeve in order not to damage a lively sheep. Preferably the roller is curved inward in its length to provide a concaving peripheral surface, as shown in Figures 1 to 4 of the drawings.

The provision to attach or mount the holder is by the back underframing and the ends of the side members 16, 17, and/or their understrap 18, resting on the ground or floor being the fixture. Such provision can be, however, by brackets or supports (not shown) on the back or a side member, whereby it can be temporarily secured on a rigid fixture, such as a fence post, gate, or a wall, for the end members or the understrap to rest on the ground or floor. Where the brackets or supports are on a side member the holder would be positioned alongside the fixture.

To ensure versatility in the holder, to adapt it for different sized animals or for confining a sheep in a more upright inverted condition, towards sitting position, the ends 13, 14 each have a steel plate 21 formed with a slot 21A and its top edge turned out as a flange; the seat member 10 is attached to the flange. The side members 16, 17 are attached by means of bolts 22 passing through holes in the end and side members and are locked with wing nuts 23. When adjustment is required for different sized sheep the seat and the slotted plates are pushed backwards or forwards so that the space between the roller 19 and the back is increased or decreased.

As an alternative, the upper ends of the side members can be provided with a series of holes through any one or more of which bolts from the underframing in the back can be passed to thereby secure the side members nearer to or further out from the back; preferably the top edges of the side members are cut straight so as not to jam against the underside of the seat members of the back. This arrangement is simple and has not been illustrated.

In use, the holder is positioned where desired as in a small yard, pen or shed, and an operator sitting on the back's seat 10 pulls a sheep so that the sheep's back moves over the curved roller 19 into the space between the side members 16, 17, and the sheep is then released. In this position the back of the more or less inverted sheep rests on the ground or floor and is confined in the inverted position by the back's vertical member 12, side members 16, 17 and the roller 19 of the holder. The operator then treats the sheep as is required, such as for footrot or dagging. To release the sheep from the holder the sheep is simply pushed outwards by the operator, the sheep quickly finding its own feet.

The nature of the holder is, therefore, one of simple construction and which can be readily transported.

In describing the means in the invention such means comprises a machine in the form of a circular platform 30 fastened on a framework of radial arms (not shown), and this platform with its associated framework is mounted for rotation upon a central axis so that the platform extends horizontally a short distance above ground or floor level. The platform 30 is supported for its rotation by a central supporting axle 31 having its bottom end journalled in a pillar block or bearing 32 bolted to the ground or floor; the platform further has a ring 33 mounted on the underside of its framework to be concentric with the axis of the axle 31. This ring is formed as a gear rack, and at suitable positions are mounted wide or roller gears 34 journalled in bearings bolted to the ground or floor. These gears 34 are designed to mesh with the gear rack 33 to rotate the platform 30.

This platform is rotated by one of the gears 34 being adapted to be driven by being coupled through a universally jointed link 35 to a gearbox 36 and gear reduction unit 37 to a motor (not shown). Dependent upon requirements, the position of such gear ring 33 can be mounted to the platform; for instance, for slower speed it would be mounted at or near the periphery of the platform.

The platform can have a further concentric ring and ground or floor rollers (not shown) for added support and stability.

Arranged at even intervals around the periphery of the platform are a number of animal holding cradles, and in the preferred instance each is of a size suitable for receiving and holding a sheep temporarily captive therein. These cradles are constructed as before mentioned, and have the raised back, the side members 16, 17 declining from the raised back down to the cradle front at the peripheral edge of the platform 30, with the rollers 19 arranged transversely of it slightly above the platform level of the cradle.

At the position of each cradle the platform 30 can be provided with a trap door 30' so that it is located between the roller 19 of the cradle and the outer peripheral portion which acts as a walkway on the platform. Races (not shown) can open to the platform at suitable points, or else can be preferably included in the floor of a shed.

In use, the platform 30 is set rotating at a slow speed with an operator sitting on the seat 10 at the back of each cradle. The sheep are arranged at a loading point for the platform and when an empty cradle reaches this point the operator on the seat thereof pulls a sheep so that its back moves over the curved roller 19 into the space between the side members 16, 17, and the grip on the sheet is released. In this position the back of the more or less inverted sheep rests on the platform 30 between the sides of the cradle and the sheep is confined in this inverted position by the back, side members and roller of the cradle. The operator then treats the sheep as is required, such as for footrot or dagging. The trap doors 30' in the platform can be opened and allow the dags or wool to fall through and then close. During this treatment the platform is revolving and fresh cradles with their attendant operators will have reached the loading point. By the time the platform will have turned through, for instance, three quarters of a circle a sheep will have been attended to, so that the operator then releases the sheep from the cradle by pushing it forward so that it moves over the roller 19 and gets clear of the platform at a spot clear of the sheep still to be treated. The sheep can then walk away, and the now empty cradle moves around until it reaches the loading point where an untreated sheep is waiting to be pulled into the cradle.

The number of cradles and associated operators will depend upon the diameter of the platform.

Having now described my invention, what I claim is:

1. An animal holder comprising a raised back, side members declining from the back at a distance apart to accommodate the animal, a roller journalled in the lower ends of the side members, and means for attaching the holder to a base, the holder being open beneath said side members, whereby the animal may be moved by its back over the roller to be confined in the space between the side members and be supported by the base, the back and the roller.

2. An animal holder according to claim 1 and in which the back has a seat member thereon.

3. An animal holder according to claim 1, and in which the means for attaching the holder includes a strap attached between the lower ends of the side members and having up-turned ends with bearing eyes in which are journalled axle stubs of the roller, the strap further having a central aperture through which a bolt can be passed for temporarily anchoring the holder.

4. An animal holder according to claim 1, and in which the roller is curved inward in its length to provide a concaving peripheral surface.

References Cited in the file of this patent

UNITED STATES PATENTS

| | | |
|---|---|---|
| 453,727 | Sample | June 9, 1891 |
| 621,116 | Mandel | Mar. 14, 1899 |
| 1,734,856 | Irsch | Nov. 5, 1929 |
| 2,752,886 | MacMichael | July 3, 1956 |

FOREIGN PATENTS

| | | |
|---|---|---|
| 156,789 | Australia | May 28, 1954 |
| 753,817 | Great Britain | Aug. 1, 1956 |